United States Patent
Gainer, Jr.

[11] Patent Number: 5,146,996
[45] Date of Patent: Sep. 15, 1992

[54] APPARATUS AND METHOD FOR THRUSTING A COVER OVER A TARGET AREA

[76] Inventor: William C. Gainer, Jr., P.O. Box 452, Luther, Okla. 73054

[21] Appl. No.: 641,849

[22] Filed: Jan. 16, 1991

[51] Int. Cl.⁵ .......................... A62C 2/06; A62C 2/08; A62C 3/00
[52] U.S. Cl. ......................................... 169/49; 169/53; 169/46; 405/60; 405/66
[58] Field of Search ...................... 169/48, 49, 50, 53, 169/43, 46; 405/60, 63, 64, 66

[56] References Cited

U.S. PATENT DOCUMENTS

| | | | |
|---|---|---|---|
| 2,306,321 | 12/1942 | Roberts | 244/136 X |
| 2,340,370 | 2/1944 | Doyle | 169/50 |
| 2,779,421 | 1/1957 | Rust | 169/53 |
| 3,049,389 | 8/1962 | Chappellier | 169/50 X |
| 3,481,405 | 12/1969 | Ward | 169/53 |
| 3,484,062 | 12/1969 | Johnson | 244/136 |
| 3,788,079 | 1/1974 | Kirk et al. | 405/66 |
| 3,902,559 | 9/1975 | Everingham | 169/50 |
| 4,172,499 | 10/1979 | Richardson et al. | 169/53 |
| 4,881,601 | 11/1989 | Smith | 169/53 |

FOREIGN PATENT DOCUMENTS

| | | | |
|---|---|---|---|
| 931198 | 6/1982 | U.S.S.R. | 169/50 |
| 1534295 | 11/1978 | United Kingdom | 169/50 |
| 2118039 | 10/1983 | United Kingdom | 169/49 |

Primary Examiner—Margaret A. Focarino
Assistant Examiner—James M. Kannofsky
Attorney, Agent, or Firm—Dunlap, Codding & Lee

[57] ABSTRACT

Apparatus and method for thrusting a cover onto a target area from a remote location. The target area may be water containing fish or a hazardous condition such as a fire and/or a chemical spill. The apparatus comprises a housing having an open cavity, a cover within the cavity, and a pressurized gas supply for propelling the cover from the cavity and onto the target area. A guide bar positioned in the housing and a support surface attached to the cover cooperate to impart rotation to the cover as the cover is propelled from the housing. The cover may be impregnated with an agent capable of neutralizing the particular hazard, or such an agent may be injected under the cover after the cover is positioned on the affected area. In the case of a chemical spill, the cover is utilized to contain the liquid and then the liquid can be cleaned up by pumping the liquid from underneath the cover.

34 Claims, 3 Drawing Sheets

TARGET AREA

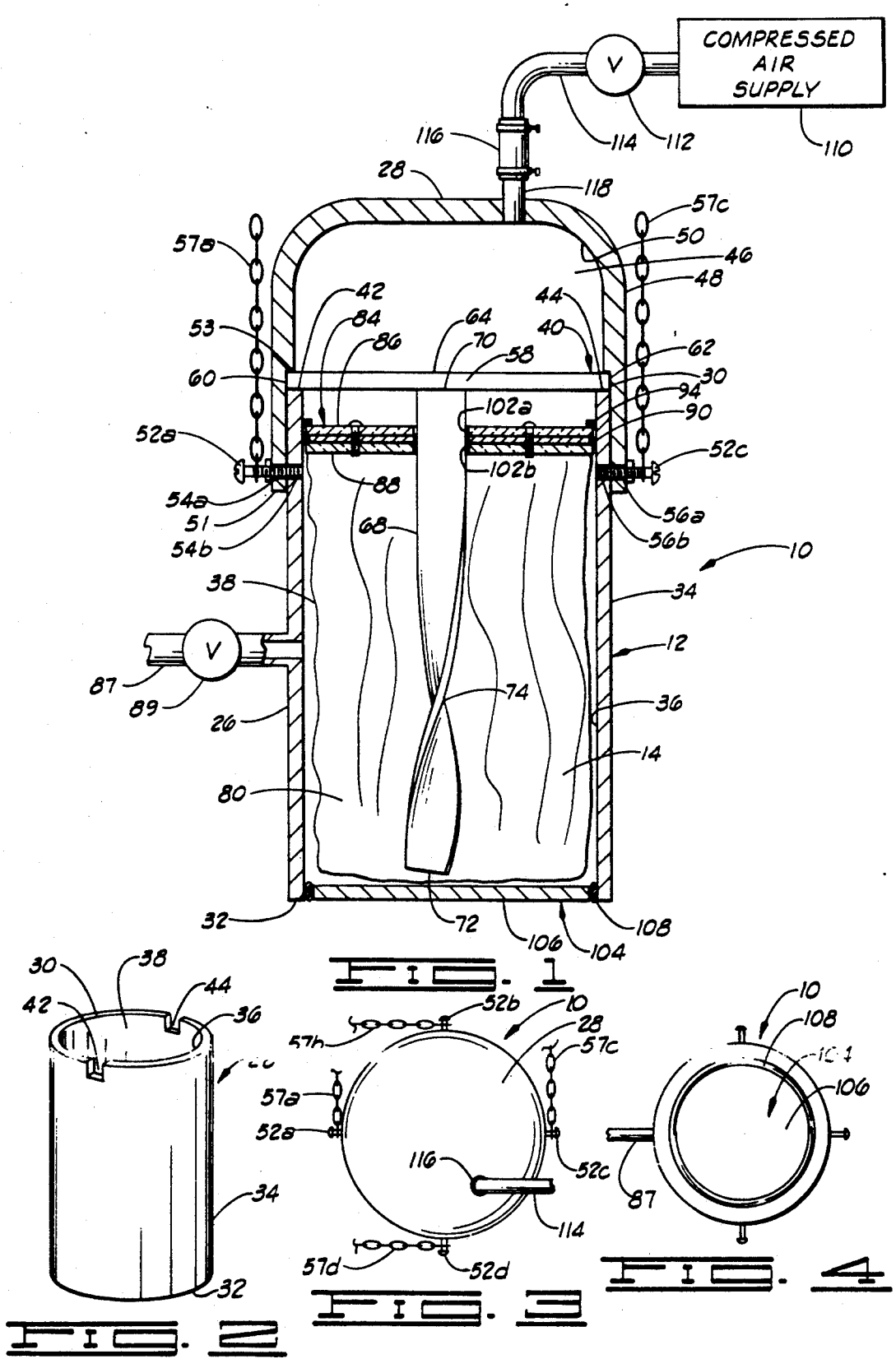

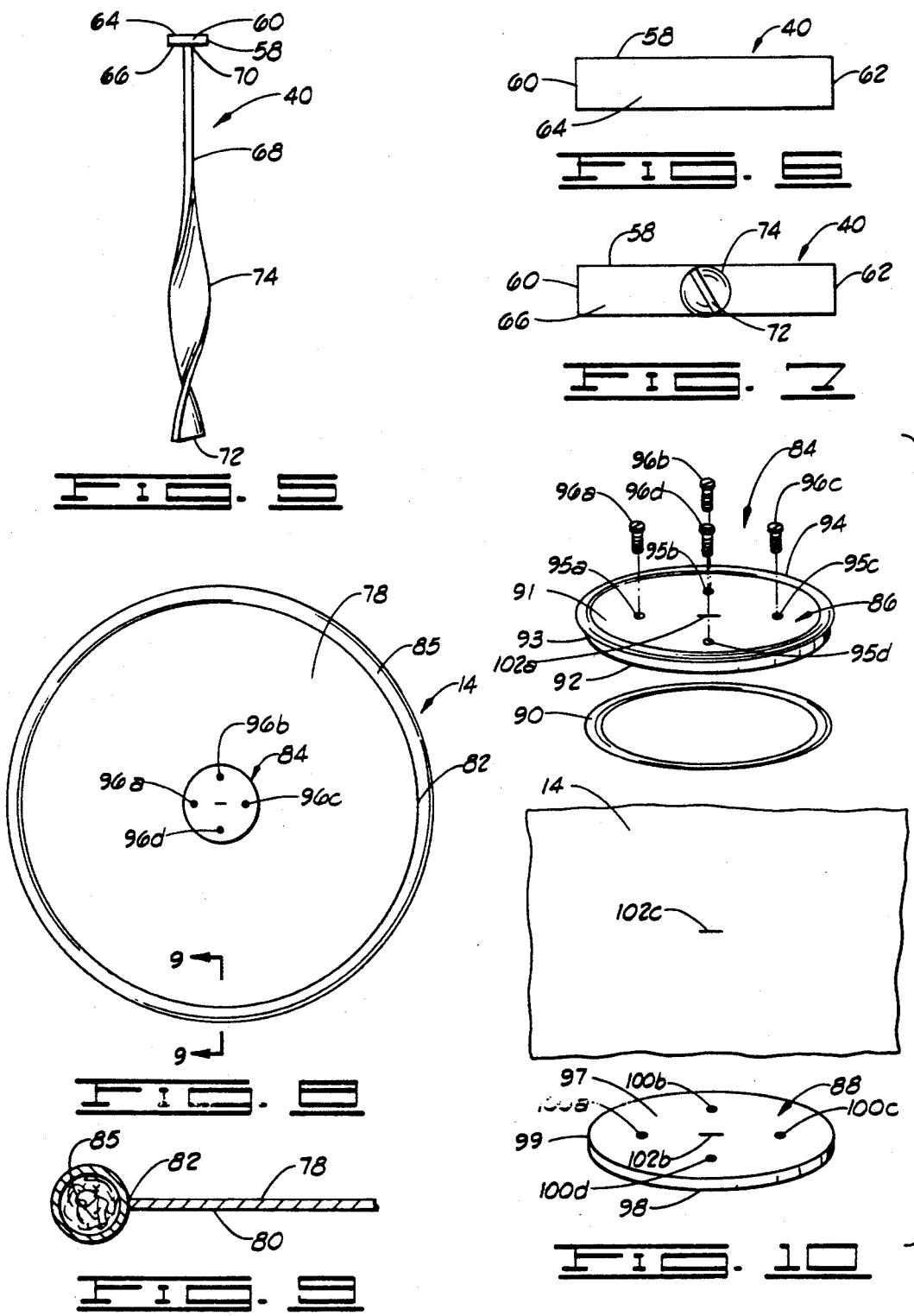

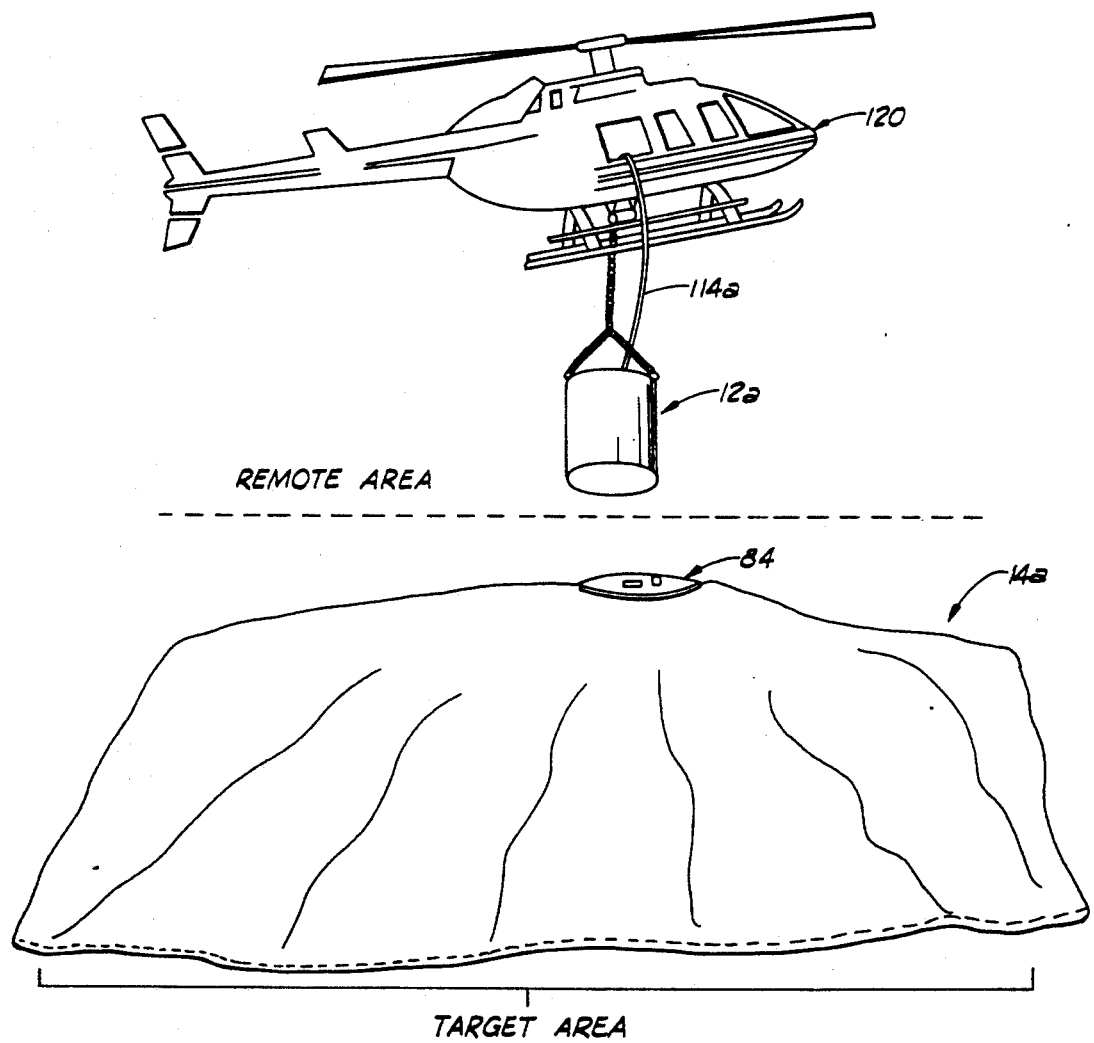

APPARATUS AND METHOD FOR THRUSTING A COVER OVER A TARGET AREA

FIELD OF THE INVENTION

This invention relates generally to devices for thrusting a cover over a target area and, more particularly but not by way of limitation, to covering an area effected by a fire or a hazardous spill.

SUMMARY OF THE INVENTION

The present invention comprises an apparatus for thrusting a cover over a target area. The apparatus comprises a housing having an opening forming a cavity within the housing, a cover disposed within the cavity sized to envelop the target area, and a thrusting means for propelling the cover from the cavity onto the target area. The cavity and the opening are sized to receive and expel the cover from the housing.

The present invention further comprises a method for thrusting a cover onto a target area. The apparatus previously described is elevated over a target area, and the cover is thrusted from the housing onto the target area.

BRIEF DESCRIPTION OF THE DRAWINGS

FIG. 1 is a cross-sectional side elevational view of a preferred embodiment of the apparatus of the present invention.

FIG. 2 is reduced perspective view of the container section shown in FIG. 1.

FIG. 3 is reduced top plan view of the apparatus shown in FIG. 1.

FIG. 4 is a reduced bottom view of the apparatus shown in FIG. 1.

FIG. 5 is a reduced side elevational view of the guide shown in FIG. 1

FIG. 6 is a reduced top plan view of the guide shown in FIG. 1.

FIG. 7 is a reduced bottom view of the guide shown in FIG. 1.

FIG. 8 is a top plan view of a cover constructed in accordance with the present invention.

FIG. 9 is an enlarged cross-sectional view of the cover 9—9 section shown in FIG. 8.

FIG. 10 is an enlarged exploded perspective view of the support surface shown in FIG. 8.

FIG. 11 is a perspective view of an apparatus of the present invention elevated by a helicopter in accordance with a method of the present invention.

DESCRIPTION OF THE PREFERRED EMBODIMENTS

The present invention thrusts a cover from a remote location onto a target area in order to contain a condition existing in the target area. "Remote location" means an area separate from the target area which is not effected by the conditions existing at the target area, but is within a distance capable of permitting the present invention to function as described herein. Some examples of use of the present invention are when the cover is a net and the target area is water containing fish; when the cover is a camouflage net and the target area is equipment; when the target area is a fire and the cover is capable of reducing the extent of the fire or extinguishing the fire completely; and when the target area is a chemical spill and the cover is capable of containing and/or reducing the toxic effects of the spill to the environment. Chemical spill as used herein includes oil as well as toxic or radioactive materials.

The present invention is not only useful in containing fires and chemical spills to the target area, but may also be used to contain materials applied to the target area used to combat the condition existing therein (hereafter "materials"). For example, when foam is applied to a fire, it may be desirable to contain the foam in the target area so as not to contaminate another area such as a stream with the foam. Additionally, the materials may be delivered by the device of the present invention to the target area. Since these materials, for example water for a fire, are normally delivered by a mist or spray, weather conditions such as wind can effect the delivery of the materials to the target area. Also, it is sometimes difficult to treat the entire target area at one time. The device of the present invention provides an efficient method of delivering the materials to substantially the entire target area at one time.

As shown in FIG. 1, the present invention comprises an apparatus designated generally by the reference number 10. The apparatus 10 comprises a housing 12, a cover 14, and means for thrusting the cover from the housing as described hereafter.

In the embodiment shown in FIG. 1, the housing 12 comprises two sections: a container section 26 comprising a hollow cylinder; and a cap section 28 forming a hollow hemisphere. As more clearly shown in FIG. 2, the container section 26 comprises an upper end 30, a lower end 32, an outer wall 34, and an inner wall 36. A uniform cylindrical cavity 38 is formed within the container section 26. The upper end 30 of the container section 26 contains two rectangular notches 42 and 44, about 180° apart which are suitable for receiving a portion of the guide 40 as described hereafter.

Referring to FIGS. 1 and 3, the cap section 28 comprises a hollow hemisphere forming a cap cavity 46, outer periphery 48 and inner periphery 50. Preferably, the inner periphery 50 of the cap section 28 is shaped so that a lip 53 is formed. The lower end 51 of the cap section 28 is lowered over the outer wall 34 of the container section 26, i.e., the cap section 28 telescopingly receives the upper end 30 of the container section 26. This leaves a cap cavity 46 above the container section upper end 30 comprising about at least 10% of the entire area of the apparatus 10, and preferably at least 20%.

The cap section 28 is removably secured to the container section 28 by any appropriate method. In a preferred embodiment more clearly shown in FIGS. 1, 3 and 4, screws 52a-d are matingly received in threaded apertures aligned in the cap section 28 and the container section 26. FIG. 1 shows screw 52a received in aperture 54a of the cap section 28 and 54b of the container section 26, and screw 52c received in aperture 56a of the cap section 28 and 56b of the container section 26.

Referring to FIGS. 1 and 3, chains 57a-d are attached to screws 2a-d in order to elevate the apparatus 10 above the target area as more fully described hereafter.

In one embodiment, the removable cap section 28 is made of heavy-wall SCH-40 PVC (polyvinyl chloride) with an inner diameter of 4.531 inches and a height of 3.625 inches. The container section 26 is made of PVC pipe with a 4-inch inner diameter, 4.375 inch outer diameter and a length of 7.687 inches.

Any size or shape of housing 12 and cavities 38 and 46 may be used in accordance with the present invention as long as the resulting apparatus can function as described herein. The housing 12 may comprise one section or a plurality of sections, and may be constructed from materials other than those described herein as long as the function of the housing is not impaired.

A guide 40 is disposed in about the middle of the container section cavity 38. Referring to FIGS. 1 and 5-7, the guide 40 comprises a cross-bar 58 of the same length as the outer diameter of the container section 26 having a first terminus 60 and second terminus 62. The cross-bar 58 further comprises an upper end 64 and a lower end 66. The cross-bar termini 60 and 62 are sized to respectively fit into the notches 42 and 44 provided in the container section upper end 30.

Still referring to FIGS. 1 and 5-7, the guide 40 further comprises an elongated twisted bar 68 secured to the cross-bar 58 lower end 66 such that when the cross-bar 58 is positioned in notches 42 and 44, the bar 68 is disposed in the center of the container section cavity 38. When the cross-bar 58 is disposed in the notches 42 and 44, the lip 53 serves to hold the cross-bar 58 in place. The bar 68 comprises an upper end 70 and a lower end 72. The bar 68 is elongated and generally flat. A twist 74 is provided in the bar 68 preferably nearer the lower end 72 than the upper end 70 of the bar 68. The bar 68 is twisted to the extent that the cover 14 supported on the bar will rotate when expelled from the container section 26 as more fully described hereafter. The bar 68 is preferably about the same length but no longer than the container section 26. Any length or degree of twist 74 may be used in the bar 68 which permits the bar 68 to function as described herein.

In a preferred embodiment, the bar 68 is constructed from 0.235 inch thick steel, and is 0.734 inches wide and 6.187 inches in length. The cross-bar 58 also consists of 0.235-inch thick steel, and is 0.734 inches wide and 4.375 inches in length. The twist 74 in the bar 68 is about 210°, and the bar 68 is welded to the center of the cross-bar lower end 66.

The twist 74 in the guide 40 serves to provide a rotational movement to the cover 14 which enhances the ability of the cover 14, once expelled from the housing 12, to spread out in a substantially horizontal plane over the target area. By spreading out uniformly in a substantially horizontal plane while over the target area, the cover 14 can then substantially cover the intended target area upon impact therewith.

Means for providing rotational movement to the cover 14 may not always be desired in the practice of the present invention. In that case, the twist 74 in the guide 40 or the guide 40 would not have to be used. However, if rotation of the cover 14 is desirable, the guide 40 is used or any other means to impart a rotation to the cover. The guide 40 is but one way this rotation may be provided. Other methods to impart a rotation to the cover 14 may be used in accordance with the present invention.

A cover 14 is disposed within the container section cavity 38. The cover 14 is sufficiently sized to envelop the selected target area, and be contained within the container section cavity 38. The cover 14 may be constructed from any suitable material which permits the cover 14 to function as described herein.

Referring to FIGS. 8 and 9, the cover 14 comprises an upper surface 78, a lower surface 80, a circular periphery 82, and a support surface 84. Preferably, the periphery 82 of the cover 14 further comprises a weight 85.

Selectively providing weight to the cover 14 can enhance the ability of the rotating cover 14 to substantially spread out uniformly once expelled from the housing 12. Weights such as fishing weights (not shown) can be secured at equidistances about the cover periphery 82.

Another weight 85 shown in FIGS. 8 and 9, is to enclose a weighted material such as sand in a roll and secure the roll to the cover periphery 82. By providing a weighted roll, the weight 85 not only to provides weight, but also provides a barrier once the cover 14 is deployed over the target area. The barrier serves to prevent liquids or foam which may be either part of the hazard (chemical spill) or part of the materials used to combat the hazard (foam or water). In a preferred embodiment, an absorbent tubular roll containing materials suitable for absorbing oils, such as Master Soaker TM 50 Non-Bio, or for absorbing chemicals, such as Master Soaker SP-2 TM Haz Mat Sock from Sellars Absorbent Materials, Inc., of Milwaukee, Wis. may be secured to the cover periphery 82 by sewing the roll to the periphery 82 or by any other means.

The weight added to the cover 14 can be placed in various portions of the cover 14 in any manner which assists in placing the cover 14 uniformly onto the target area or in shaping the cover to conform to the shape of the target area. Such weight may also be securely disposed upon, enclosed within or attached to the cover 14 in any fashion which serves to accomplish the object of the apparatus 10.

Although the use of weights are a preferred method to enhance the ability of the cover 14 to substantially spread out uniformly, other methods besides weights may be used. In a preferred embodiment, the cover 14 is circular with an outer diameter of 42.625 inches, and is containable within a container section 26 having an inner diameter of 4 inches and a length of 7.687 inches. This cover 14 is constructed from 59% linen and 41% cotton (Linette TM by Covington Mills—1.6 running yard equals 1 pound). The cover 14 has one-hundred 0.25 gm fishing weights crimped at equidistances about the periphery 82.

The cover support surface 84 serves to provide a surface upon which a force may be exerted to expel and/or rotate the cover 14 from the housing 12. A portion of the cover 14 may be treated to provide a suitable surface for the exerted force. Preferably, the support surface 84 comprises an inflexible upper disk 86, an inflexible lower disk 88, and an o-ring 90 therebetween.

The upper disk 86 comprises an upper surface 91, lower surface 92, and a circular periphery 93. A rubber circular seal 94 is secured to the upper surface 91 near the periphery 93 thereof. The upper disk 86 has four apertures 95a-d to receive screws 96a-d therethrough.

The lower disk 88 comprises an upper surface 97, a lower surface 98 and a circular periphery 99, and is sized about the same as the upper disk 86. Threaded apertures 100a-d are respectively aligned with upper disk apertures 95a-d, and securingly receive screws 96a-d. Upper disk apertures 95a-d are sized slightly larger than lower disk apertures 100a-d and are shaped so that screws 96a-d can be countersunk in the upper disk 86.

In a preferred embodiment, the disks 86 and 88 are two plexiglass disks with a 3.890 inch outer diameter positioned on opposite surfaces of the middle of the cover 14. The O-ring 90 has a 4.078-inch outer diameter secured between the disks 86 and 88 as shown in FIG. 1 which frictionally engages the container section inner wall 36 which has an inner diameter of 4 inches.

Referring to FIG. 10, each disk 86 and 88 and the portion of the cover 14 therebetween further comprises a guide slot, respectively 102a-c, sized to slidingly receive the twisted bar 68 of the guide 40.

As shown in FIG. 1, the guide 40 is received in the guide slots 102a-c. The support surface 84 is pushed up the guide twisted bar 68 past the twist 74 near the twisted bar upper end 70. The cover 14 is compressed within the container section 26. The O-ring 90 frictionally engages the container section inner wall 36 both permitting the support surface 84 to remain in position and creating a seal between the cap cavity 46 and the cover section cavity 38.

Once the cover 14 is disposed within the container section 26, a rupture membrane 104 is positioned at the container section lower end 32. The rupture membrane 104 serves to keep the cover 14 within the container section 26, but is readily released upon pressure when the cover 14 is expelled from the housing 12. Preferably, the rupture membrane 104 also serves to retain liquid contained within the container section 26. In some embodiments, the rupture membrane 104 may not be necessary.

In a preferred embodiment shown in FIGS. 1 and 4, the rupture membrane 104 comprises a disk 106 to which is secured an O-ring 108, and is sized such that the O-ring frictionally engages the container section inner wall 36 providing a seal therewith.

Preferably, the cover 14 is impregnatable or impregnated with a neutralizing agent. "Neutralizing agent" means an agent capable of treating the cover 14 so as to enhance the ability of the cover 14 to combat the hazardous effects of a condition within the target area. For example, the condition within the target area may be a fire, and the neutralizing agent would be any agent capable of nullifying the damaging effects of the fire and/or smoke. Typically, a neutralizing agent for a fire is an aqueous solution, carbon dioxide, halon or foam such as Firevoid TM by Safety Plus of Lexington, Ky. When the condition is a chemical spill, the neutralizing agent can be a basic solution such as sodium bicarbonate solution to combat an acid spill, or a slightly acidic solution such as dilute acetic acid to combat a basic spill. When the condition is a radioactive spill, the neutralizing agent can be boronated water. Some neutralizing agents used in accordance with the present invention are listed in the 1987 EMERGENCY RESPONSE GUIDEBOOK, U.S. Department of Transportation #DOT P 5800.4, September 1987, hereby incorporated herein. Sometimes a neutralizing agent may not be necessary, but the cover 14 may be customized to combat the hazardous condition, e.g., the cover 14 may be absorbent in order to absorb oil or other chemicals.

The cover 14 may be impregnated with the neutralizing agent before placement in the housing 12 or by exposing the cover 14 to the agent while in the housing 12. One way to treat the cover 14 within the housing is to inject a quantity of the agent sufficient to saturate the cover 14 into the housing 12 via conduit 87. A valve 89 serves to close access to the container section 26 after the agent is injected therein.

The cover 14 is expelled from the housing 12 by any means which serves to thrust the cover 14 onto the target area. Preferably, the force of the thrust is sufficient to extinguish a flame in the target area, i.e., the cover 14 does not merely float over and land on the target area, but rather is thrust upon the target area thus depleting the oxygen supply to the flame. In a preferred embodiment shown in FIG. 1, a burst of compressed air is released from a pressurized air supply 110 through an opened valve 112 in an air-tight hose 114 secured via a coupler 116 to a conduit 118 which opens into the cap section cavity 46. Thus, the compressed air is released into the ca section cavity 46 to place pressure upon the support surface 84. In a preferred embodiment, compressed air is supplied at 150 psi pressure through 25-foot length of ⅜-inch air hose to a 0.25 inch air restrictor (conduit 118), and a ½-inch ball valve functions to open and close access to the air.

Other types of gas, such as nitrogen, may be used to provide the force required to expel the cover 14 from the housing 12 and onto the target area. Also, other methods to expel the cover 14 from the housing 12 may be used so long as the apparatus functions as described herein.

Preferably, the expulsion of the cover 14 from the housing 12 also acts to provide rotational movement to the support surface 84 to open the cover 14 in a substantially horizontal plane over the target area in order to substantially cover the target area. The amount of the target area enveloped by the cover 14 will depend upon many factors such as the distance of the apparatus 10 from the target area prior to deployment of the cover 14, the environmental conditions such as wind, the amount of force used to expel the cover 14 from the housing 12, and the construction of the cover 14.

The cover "substantially spreads out uniformly over the target area" when 50%-100% of the target area is enveloped by the cover 14. Preferably, 75%-100% of the target area is enveloped by the cover in accordance with the present invention, and, more preferably, 85%-100%.

In a preferred embodiment, an apparatus 10 as shown in FIG. 1 having a 42.625 inch diameter cotton cover saturated with water and weighted with one-hundred 0.25 gm fishing weights secured at equal distances about the periphery of the cover, was thrust from a height of 82 inches above a target area measuring 2 square feet. A burst of compressed air at 150 psi pressure for a few seconds expelled the cover 14 from the housing 12. The guide 40 had a 210° twist 74 in the bar 68 providing rotation movement to the cover. Ninety-five per cent of the target area was enveloped by the cover 14. Using the same apparatus and target area and under the same conditions, the following test data were obtained: at 75 inches above the target area, the cover 14 enveloped 85% of the target area; at 70 inches above the target area, the cover 14 enveloped 70% of the target area; and at 60 inches above the target area, the cover 14 enveloped 50% of the target area.

In use, the apparatus 10 is elevated above the target area. Elevation of the apparatus 10 may be accomplished by any appropriate means such as by helicopter 120 (FIG. 11) or lifting crane (not shown). The apparatus is lifted by chains 57a-d and operationally attached to the helicopter 120, i.e., the apparatus may be activated from the helicopter. A gas supply (not shown) in the helicopter fills hose 114a which empties into the apparatus which expels the cover 14a over the target area leaving housing 12a secured to the helicopter 120.

In some situations, the apparatus may be permanently mounted over a potentially hazardous target area and activated whenever an emergency situation arises (not shown). The target area could be inside a facility, such a research laboratory, or in an open area, as in a chemical or petroleum products plant.

After the cover 14a envelops the target area, neutralizing agents may be pumped under the cover 14a. Also, a suction (not shown) can be placed under the deployed cover 14a to remove any unwanted liquids thereunder.

Changes may be made in the combinations, operations, arrangements and steps of the various parts, elements and methods described herein without departing from the spirit and scope of the invention as defined in the following claims.

What is claimed is:

1. An apparatus for thrusting a cover over a target area, the apparatus comprising:
   a housing having an opening forming a cavity within the housing;
   a cover disposed within the cavity and sized to envelop the target area, the cover comprising a support surface substantially in the middle of the cover; and
   thrusting means for propelling the cover from the cavity onto the target area, the thrusting means comprising means for providing sufficient pressure to the support surface within the housing sufficient to expel the support surface and the cover from the housing cavity and onto the target area;
   wherein the cavity and the opening are sized to receive and expel the cover from the housing.

2. The apparatus of claim 1 wherein the means for providing sufficient pressure to the support surface comprises a burst of sufficient amount of gas applied to the support surface so that the cover is expelled from the housing and onto the target area.

3. The apparatus of claim 1 wherein the support surface comprises at least one inflexible disk secured to the cover.

4. The apparatus of claim 1 wherein the cover comprises flame retardant material.

5. The apparatus of claim 1 wherein the cover comprises a material impregnated with a flame retardant agent.

6. The apparatus of claim 1 further comprising:
   a removable covering for the housing opening; and
   an effective amount of a flame retardant agent in contact with the cover sufficient to enhance the ability of the cover to extinguish a flame in the target area.

7. The apparatus of claim 1 wherein the cover comprises fabric.

8. The apparatus of claim 1 wherein the cover comprises a net.

9. An apparatus for thrusting a cover over a target area, the apparatus comprising:
   a housing having an opening forming a cavity within the housing;
   a cover disposed within the cavity and sized to envelop the target area, the cover comprising a support surface substantially in the middle of the cover; and
   thrusting means for propelling the cover from the cavity onto the target area, the thrusting means providing sufficient pressure to the support surface within the housing cavity to expel the cover from the housing cavity and onto the target area with sufficient force to extinguish a flame in the target area.

10. An apparatus for thrusting a cover over a target area, the apparatus comprising:
    a housing having an opening forming a cavity within the housing;
    a cover disposed within the cavity and sized to envelop the target area;
    thrusting means for propelling the cover from the cavity onto the target area; and
    centrifugal means for imparting a rotation to the cover so that once expelled from the housing, the cover substantially spreads out uniformly over the target area;
    wherein the cavity and the opening are sized to receive and expel the cover from the housing.

11. The apparatus of claim 10 wherein the cover further comprises a support surface substantially in the middle of the cover, and the centrifugal means comprises:
    a guide secured within the housing cavity which provides a rotational motion to the support surface and thereby to the cover as the cover is expelled from the housing cavity.

12. The apparatus of claim 11 in which the support surface further comprises a slot, and the guide comprises an elongated twisted bar secured in substantially the center of the housing cavity which is received in the slot, the bar being shaped and sized to provide sufficient rotational movement to the cover once expelled to spread out uniformly over the target area.

13. The apparatus of claim 11 wherein the centrifugal means further comprises means for adding sufficient weight to the cover to enhance the ability of the cover to substantially spread out over the target area.

14. The apparatus of claim 13 wherein the cover further comprises a periphery and wherein the means for adding weight to the cover comprises weights added to the periphery of the cover.

15. The apparatus of claim 14 wherein the means for adding weight comprises as effective amount of absorbent material enclosed in the cover uniformly about the periphery of the cover and further comprises a means for providing a barrier about the target area.

16. An apparatus for thrusting a cover over a target area, the apparatus comprising:
    a housing having an opening forming a cavity within the housing;
    a cover disposed within the cavity and sized to envelop the target area;
    thrusting means for propelling the cover from the cavity onto the target area; and
    means for elevating the apparatus above the target area prior to propelling the cover from the housing;
    wherein the cavity and the opening are sized to receive and expel the cover from the housing.

17. The apparatus of claim 16 wherein the means for elevating the apparatus above the target area comprises:
    means for operationally attaching the apparatus to an aircraft capable of positioning the apparatus over the target area.

18. An apparatus for thrusting a cover over a target area, the apparatus comprising:
    a housing having an opening forming a cavity within the housing;
    a cover disposed within the cavity and sized to envelop the target area;
    thrusting means for propelling the cover from the cavity onto the target area;
    a rupture disk removably secured in the housing opening; and an effective amount of a neutralizing agent in contact with the cover sufficient to enhance the ability of the cover to neutralize a condition in the target area.

19. An apparatus for thrusting a cover over a target area, the apparatus comprising:
 a housing having an opening forming a cavity within the housing, the housing comprising a removable cap section attached to a container section, the housing cavity being formed in the container section and the cap section;
 a cover disposed within the cavity and sized to envelope the target area; and
 thrusting means or propelling the cover from the cavity onto the target area;
 wherein the cover is compressingly disposed within the container section and at least a portion of the thrusting means is disposed in the cap section, and wherein the cavity and the opening are sized to receive and expel the cover from the housing.

20. A method for thrusting a cover onto a target area, the steps of the method comprising:
 providing a housing having an opening forming a cavity within the housing;
 disposing a cover within the cavity, the cover being sized to envelop a target area;
 elevating the housing over the target area; and
 thrusting the cover from the housing and onto the target area.

21. The method of claim 20 further comprising:
 impregnating the cover with a flame retardant agent to extinguish a flame in the target area.

22. The method of claim 20 further comprising:
 providing the cover with a weighted periphery; and
 rotating the cover so that, once expelled from the housing, the cover substantially spreads out uniformly over the target area.

23. The method of claim 20 further comprising:
 impregnating the cover with a substance capable of absorbing oil to absorb an oil spill in the target area.

24. The method of claim 20 further comprising:
 impregnating the cover with a neutralizing agent to neutralize a toxic chemical spill in the target area.

25. The method of claim 20 further comprising:
 impregnating the cover with a substance capable of reducing the emission of radiation to reduce the emission of radiation from a radioactive substance in the target area.

26. The method of claim 20 further comprising:
 injecting an agent under the cover after the cover has been propelled from the housing and onto the target area.

27. The method of claim 20 further comprising:
 removing liquids contained under the cover disposed on the target area.

28. The method of claim 20 wherein the step of elevating the housing over the target area comprises lifting the housing by an aircraft capable of disposing the housing over the target area.

29. The method of claim 20 further comprising:
 providing a support surface substantially in the middle of the cover.

30. The method of claim 29 further comprising:
 providing sufficient pressure to the support surface by a burst of gas to the support surface so that the cover is expelled from the housing and onto the target area.

31. The method of claim 20 further comprising:
 providing the cover with a weighted periphery of absorbent material capable of forming a barrier about the target area to retain liquids under the cover in the target area.

32. The method of claim 31 further comprising:
 injecting a neutralizing agent under the cover after thrusting the cover onto the target area to neutralize a chemical spill in the target area.

33. The method of claim 31 further comprising:
 injecting an oil-absorbing substance under the cover after thrusting the cover onto the target area to absorb an oil spill in the target area.

34. The method of claim 31 further comprising:
 injecting a neutralizing agent under the cover after thrusting the cover onto the target area to neutralize a toxic chemical spill in the target area.

* * * * *

UNITED STATES PATENT AND TRADEMARK OFFICE
CERTIFICATE OF CORRECTION

PATENT NO. :   5,146,996
DATED      :   September 15, 1992
INVENTOR(S) :  William C. Gaines, Jr.

It is certified that error appears in the above-identified patent and that said Letters Patent is hereby corrected as shown below:

Column 2, line 58, please delete the word "2a-d" and substitute therefore the word --52a-d--.

Column 8, line 37, please delete the word "as" and substitute therefore the word --an--.

Column 9, lines 13 & 14, please delete the word "envelope" and substitute therfore the word --envelop--.

Signed and Sealed this

Twelfth Day of October, 1993

BRUCE LEHMAN

Attest:

Attesting Officer

Commissioner of Patents and Trademarks